United States Patent
Tsurumi

(12) 
(10) Patent No.: US 6,359,405 B1
(45) Date of Patent: Mar. 19, 2002

(54) FAILURE DETECTION SYSTEM FOR A PROPULSION SYSTEM

(75) Inventor: Takafumi Tsurumi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/565,487

(22) Filed: May 5, 2000

(30) Foreign Application Priority Data

May 7, 1999 (JP) .......................................... 11-127789

(51) Int. Cl.⁷ ................................................ H01G 9/00
(52) U.S. Cl. ........................ 318/434; 318/638; 318/768
(58) Field of Search ................................ 318/434, 638, 318/768

(56) References Cited

U.S. PATENT DOCUMENTS 5,357,181 A * 10/1994 Mutoh et al.
5,461,531 A * 10/1995 Tuchiya et al.
5,471,359 A * 11/1995 Simpson et al.
5,689,170 A * 11/1997 Ishikawa
5,889,380 A * 3/1999 Takada et al.
6,009,003 A * 12/1999 Yeo
6,131,057 A * 10/2000 Tamaki et al.

* cited by examiner

Primary Examiner—Jeffrey Donels
(74) Attorney, Agent, or Firm—Armstrong, Westerman & Hattori, LLP

(57) ABSTRACT

In a propulsion system for hybrid vehicles, etc., a failure detection system that detects the occurrence of failure that obstructs a phase current supplied to an electric motor for propulsion. The direct current of the battery is converted to three-phase alternating current by an inverter and supplied to the electric motor. The controller drive controls the inverter so that the output torque of the electric motor attains a target torque. Each of the phase currents supplied to the electric motor are detected by a current sensor, and provided to a comparator. The comparator compares the value of each of the detected phase currents and the current limit value calculated by the current limit value calculation circuit, and outputs a signal showing that a current phase has abnormally risen. This signal is counted by the counter, and the occurrence of failure is identified based on this count value.

7 Claims, 5 Drawing Sheets

FAILURE DETECTION SYSTEM FOR A PROPULSION SYSTEM

BACKGROUND OF THE INVENTION

1. Field of the Invention

The present invention relates to a failure detection system in a propulsion system mounted in an electric vehicle, a hybrid vehicle, etc., having an electric motor as a propulsion system.

2. Description of the Related Art

In recent years, internal combustion engines that directly inject fuel into the cylinder of an engine and serving as propulsion device for automobiles have been developed and commercialized with the goals of protecting the environment and energy reduction. Furthermore, hybrid automobiles that have installed a propulsion system that combines this type of engine and an electrical motor for propulsion have been gaining notice.

One type of such a hybrid vehicle is a parallel hybrid vehicle that uses an electrical motor as an auxiliary driving source to supplement the output of the engine. As disclosed in Japanese Unexamined Patent Application, First Publication, No. Hei 7-123509, in order to satisfy the needs of the driver while at the same time maintaining the remaining charge of the battery, this parallel hybrid vehicle carries out various types of control such as supplementing the output of the engine using the electrical motor during acceleration and charging the battery by regenerative deceleration during deceleration.

FIG. 5 shows the main components of a propulsion system installed in this hybrid vehicle. In this figure, reference numeral 3 is a battery that generates direct current for driving the electric motor M. Reference numeral 200 is an inverter that converts the direct current supplied from the battery 3 into three-phase alternating current, and provides transistors (IGBT) 201, 202, 203, 204, 205, and 206 whose currents are controlled by signals UL, UH, VL, VH, WL, and WH from a controller 800, described below.

Here, the transistors 201 and 202 are cooperatively conduction controlled by signals UL and UH, and the U-phase of the alternating current is generated from these connection points. In addition, transistors 203 and 204 are cooperatively conduction controlled by signals VL and VH, and the V-phase of the alternating current is generated from these connection points. Furthermore, transistors 205 and 206 are cooperatively conduction controlled by signals WL and WH, and the W-phase of the alternating current is generated from these connection points.

Reference numeral M is, for example, a brushless DC electric motor driven by the three-phase alternating current supplied from the inverter 200, reference symbol $S_8$ is a current sensor that detects the output current of the battery 3, reference symbol $S_9$ is a voltage sensor that detects the output voltage of the battery 10, reference numeral 70 is a magnetic pole position sensor that detects the magnetic pole position of the electric motor 30, and reference numeral 800 is a controller that generates the signals UL, UH, VL, VH, WL, and WH that provide drive control of the inverter 200 based on the signals from each sensor.

In the following explanations, the inverter 200 and the control systems such as the controller 800 for providing drive control of the electric motor M are called the "motor control system".

Below, the control operation of the electric motor M by this motor control system is explained.

In the case that the electric motor M is driven by a voltage input, the controller 800 that serves as the motor control system carries out torque control of the electric motor M. That is, the controller 800 inputs each of the signals from the voltage sensor $S_9$, the current sensor $S_8$, and the magnetic pole position sensor 70, and monitors the current and voltage supplied from the battery 3 along with the number of revolutions of electric motor M. In addition, according to an externally given target torque and the number of revolutions of the electric motor M, the target current that should be supplied from the battery 3 is found, and each of the voltage values of the signals UL, UH, VL, VH, WL, and WH output to the inverter 200 are controlled so that the product of the current and voltage monitored (that is, the electrical power) agrees with the target electrical power. Thereby, as a result of control of the current (that is, each of the phase currents) flowing through each transistor in inverter 200, torque control is carried out so that the output torque of the electric motor M attains the target torque.

However, in the system described above, in spite of being subject to severe quality control during manufacture, each part gradually deteriorates over time due to long use, and when the service life has passed, there are cases when there is the occurrence of failure of the type that any one of the phase currents supplied to the electrical motor M becomes obstructed. An example of this failure is the case in which the conduction condition of the gate drive line 810 for supplying the signals from the controller 800 to the gate of the inverter 200 and the three-phase line 210 for supplying three-phase alternating current to the electric motor M from the inverter 200 become defective and short out. Additional examples of possible failure are the conduction of the transistors that form the inverter 200 becoming defective, the windings of the electric motor M being broken, and the magnetic strength of the permanent magnets in the electric motor M attenuating.

Here, in the above-described propulsion system, when there is the occurrence of failure such as the obstruction of the U phase of the current supplied to the electric motor M, according to the above-described motor control system, because the remaining V phase and W phase of the current are increased in order to generate the target torque when the U phase of the current is obstructed, each of the current values of the V phase and the W phase rise abnormally. When this type of torque control is carried out, a large change in the output torque of the electric motor M does not appear, and thus there is the problem that frequently the driver of the vehicle will not notice this failure. In addition, there is also the problem that if this type of failure is left as is over a long time period, the chance of failure due to the abnormal rise in current supplied to the electric motor 30 will increase.

In consideration of the above-described problems, an object of the present invention is to provide a failure detection system for a propulsion system that detects the occurrence of failure such as obstruction of the currents supplied to the electric motor for propulsion in the drive system of, for example, an electric automobile or a hybrid vehicle.

SUMMARY OF THE INVENTION

In order to achieve that above-described objects, the present invention has the following structure.

According to this invention, failure detection system in a propulsion system having an electric motor (an essential component corresponding for example to electric motor M described below) as a drive device that drives the vehicle and a motor control system (an essential component corresponding for example to the battery 3, the torque control processing circuit 101, the inverter 200, the current sensor $S_8$, and the voltage sensor $S_9$ described below) that drives this electric motor by supplying polyphase current to it, wherein each of the phase currents of the polyphase current is changed such that the output torque of this electric motor attains the target torque that this electric motor should generate, and provides an abnormal rise in current detection device (an essential component corresponding for example to the current sensor $S_{10}$, the current limit value calculation circuit 103, and the comparator 104 described below) that detects an abnormal rise in current in any of the phases of this polyphase current and a failure identification device (an essential component corresponding for example to the counter 105 and the failure identification processor (steps S1~S4 described below) that identifies failure based on the frequency of occurrence of abnormally rising current detected by the abnormal rise in current detection device, and wherein the occurrence of failure that obstructs any one of the current phases supplied to the electric motor for propulsion by carrying out failure identification by detecting an abnormal rise in current occurring in the phase currents supplied to the electric motor.

Specifically, according to this invention, the motor control system controls each of the phase currents so that the electric motor generates the target torque. Here, when failure occurs that obstructs a certain phase current among the polyphase currents supplied to the motor, this phase current decreases and the output torque of the electric motor falls below the target torque. At this time, the motor control system acts so as to maintain the output torque of the electric motor at the target torque by increasing the other phase currents. As a result, the other phase currents rise abnormally. Therefore, when this abnormal rise in current is detected, the occurrence of failure can be detected. In addition, there are rare cases in which this abnormal rise in a phase current is caused by factors other than failure, such as noise, but according to this invention, failure is identified by recognizing an abnormal rise in current generated due to failure based on the frequency of the occurrence of the abnormally high current.

In addition, the abnormal rise in current detection device described above is characterized in providing a current sensor (an essential component corresponding for example to the current sensor $S_{10}$ described below) that detects respectively each of the phase currents of the polyphase current supplied to the electric motor from the motor control system, a reference value calculation circuit (an essential component corresponding for example to the current limit value calculation circuit 103 described below) that calculates the reference value (an element corresponding to the current limit value 103 described below) giving the reference for detecting the abnormally high current, and a comparator (an essential element corresponding to the comparator 104 described below) that compares the value of each of the phase currents detected by the current sensor and this reference value.

According to this structure, the abnormal rise in current is detected by comparing the value of each of the phase currents of the electric motor detected by the current sensor to a reference value that gives the reference for detection of the abnormal the current. Here, for example, the reference current value is set between the maximum value that each of the phase currents establishes when no phase current is obstructed and the minimum value that phase currents establish when another phase current is obstructed.

Furthermore, the failure identification device is characterized in having a counter (an essential component corresponding for example to the counter 105 described below) that counts the frequency of the occurrence of abnormal rise in current based on the result of the comparison by the comparators and failure is identified to have occurred (a function corresponding to steps S1 to S4 executed by the failure identification processor described below) when the counter value of this counter significantly exceeds the number of the occurrences of abnormal rise in current that would occur by chance in each of the phase currents supplied to the electric motor.

According to this structure, the number of occurrences of abnormal rises in current detected by the abnormal rise in current detection device is counted, and in the case that this count value significantly exceeds the frequency of the occurrence of abnormal rises in current that would occur by chance, the occurrence of failure is detected. Thus, even when abnormal rises in current occur due to chance factors other than failure, there is no identification of the occurrence of failure, and false identifications related to the occurrence of failure can be avoided.

Furthermore, a current limiter circuit (an essential component corresponding for example to the current limiter circuit 102 explained below) that limits each of the phase currents supplied to the electric motor based on the results of comparison by the comparator is provided.

According to this structure, when a phase current supplied to the electric motor rises abnormally, this phase current is limited. Therefore, if the amount of the limit of this phase current is appropriately set, even when there is an abnormal rise in current flow, the failure due to the rise in this phase current does not spread. That is, in the case that failure occurs that is due to an obstruction of a phase current, another phase current is raised so that the output torque of the electric motor attains the target torque, but as a result, there are cases in which an excessive current flows to the electric motor, and the failure spreads. Thus, when an abnormal rise in current occurs, the current limiter circuit inhibited the occurrence of an excessive current that could spread the failure.

Moreover, in this invention, "rise in current" device an increase in the absolute value of the current. Therefore, the concept of "rise in current" naturally includes the case that the current increases in the positive direction, but also includes an increase in the negative direction.

DETAILED DESCRIPTION OF THE INVENTION

Hereinafter, the preferred embodiment of the present invention will be explained referring to the figures.

Figure 5:
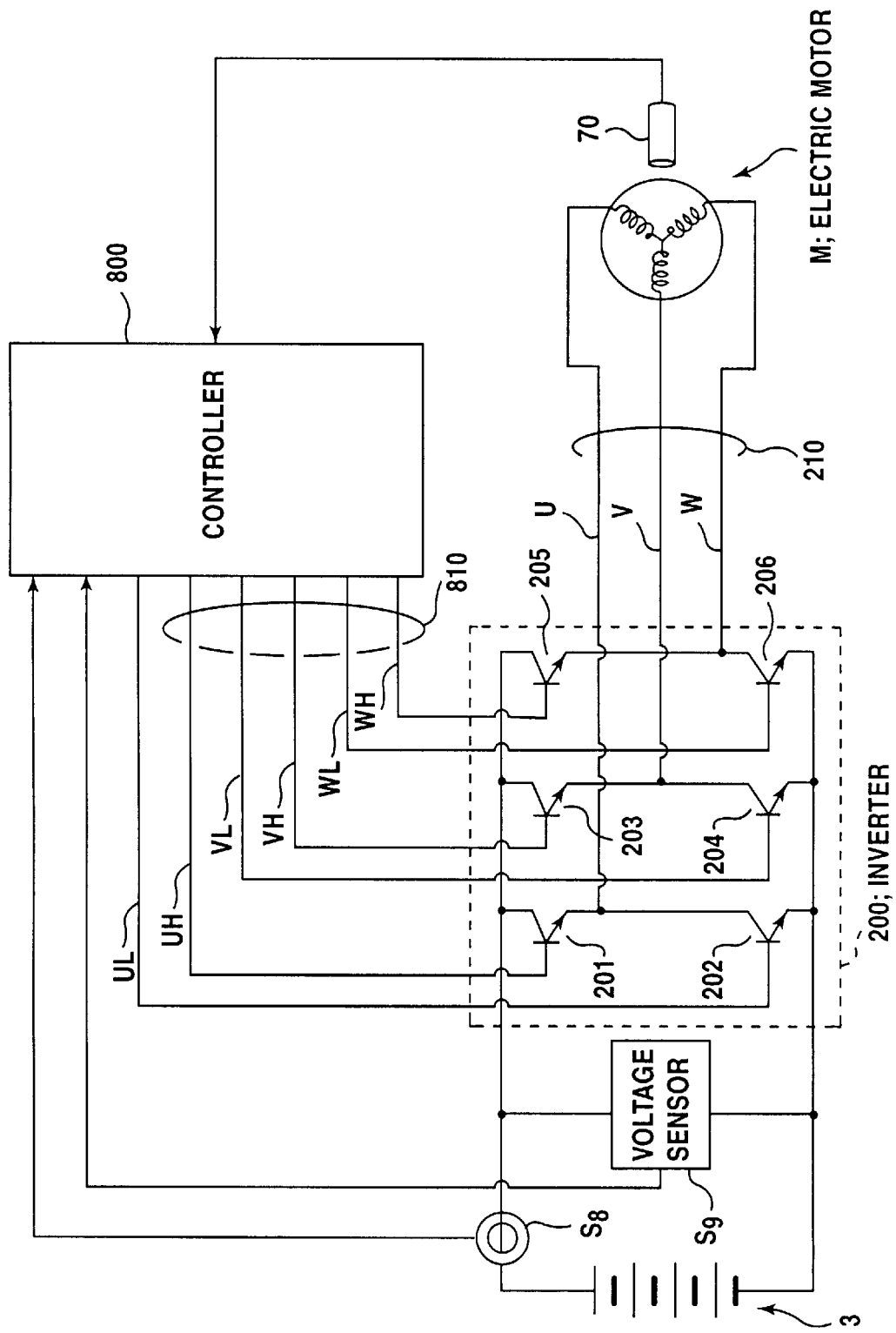
FIG. 5 is a block diagram showing an example of the structure of a conventional drive system.

Moreover, in each figure, elements that are common with those in FIG. 5 described above have the same reference numerals, and their explanations have been omitted.

Figure 1:
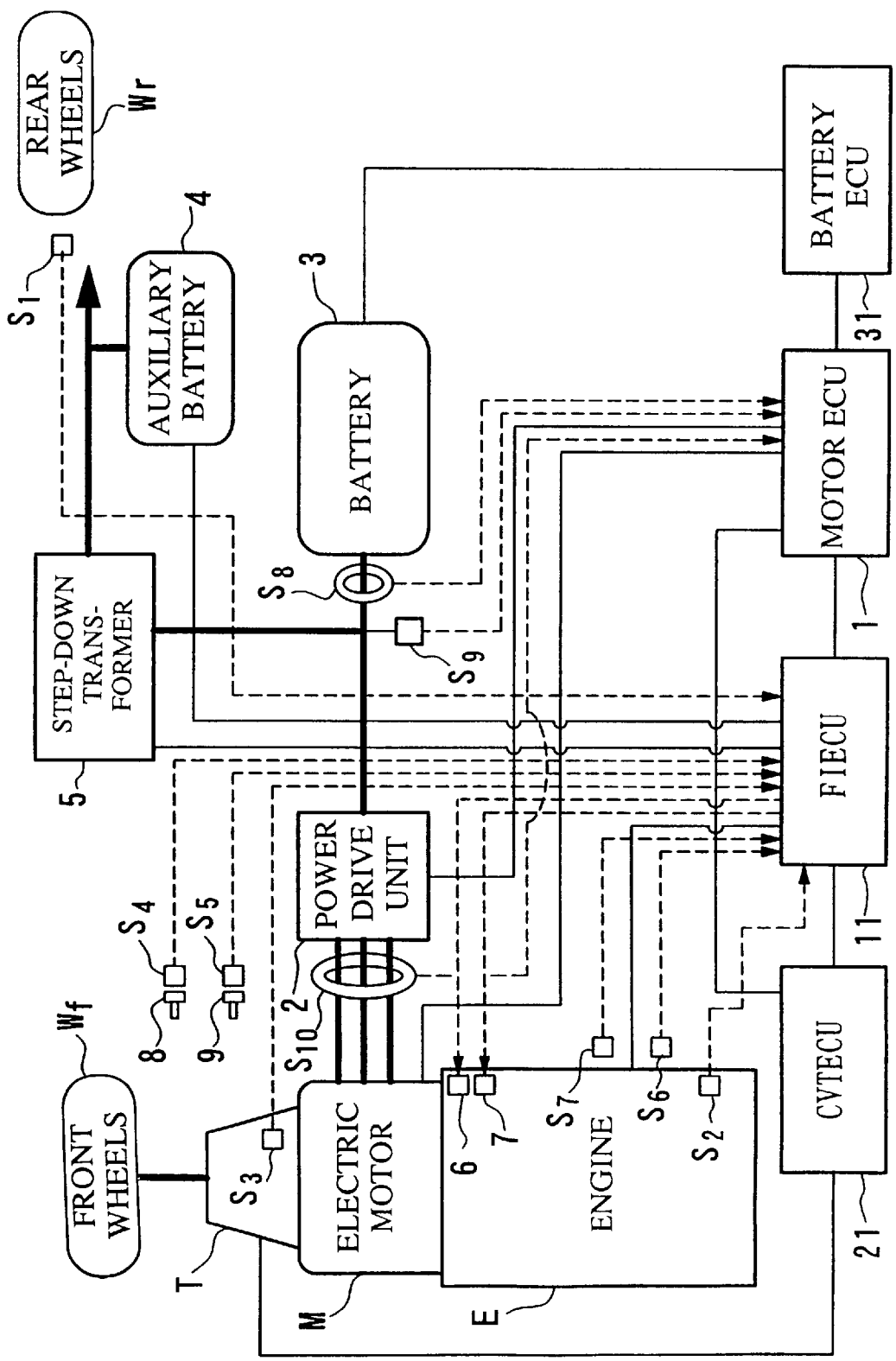
FIG. 1 is a block diagram showing the entire structure of the drive system in which the failure detection system according to the embodiment of the present invention is used.

FIG. 1 shows the entire structure of a propulsion system mounted on a parallel hybrid vehicle that applies the failure detection system according to this embodiment. The drive power of both the engine E and the electric motor M that serve as a device of propulsion is transmitted to the front wheels Wf and Wf, which are the drive wheels, via the transmission T, which is either an automatic transmission or a manual transmission. In addition, during deceleration of the hybrid vehicle, when the drive power is transmitted to the electric motor M side from the front wheels Wf and Wf, the electric motor M generates what is termed a damping force by functioning as a generator, and recovers the kinetic energy of the vehicle body as electrical energy. Moreover, the structure can provide an electric generator in addition to the electric motor for propulsion.

The power drive unit 2 carries out the drive and recovery operations of the electric motor M by receiving a control command from the motor ECU 1. This power drive unit 2 connects the electric motor M to a high voltage battery 3 that delivers the electrical energy. The battery is a plurality of modules serially connected, and these modules in turn are a plurality of cells serially connected into a unit. In addition, a 12-volt auxiliary battery 4 for driving various types of auxiliary devices is installed in the hybrid vehicle, and this auxiliary battery 4 is connected via the step-down transformer 5. The step-down transformer 5, controlled by the FIECU 11, charges the auxiliary battery 4 by stepping-down the voltage of the battery 3.

The motor ECU 1 is for controlling the drive state of the electric motor under control of the FIECU 11, described below, inputs signals from the current sensor $S_8$ and the voltage sensor $S_9$, which respectively detect the current and voltage supplied from the battery 3, and the signals from the current sensor $S_0$ that detects the three-phase current supplied to the electric motor M from the power drive unit 2. Thereby, the motor ECU 1 drive controls the power drive unit 2.

Along with the motor ECU 1 and the step-down transformer 5 described above, the FIECU 11 carries out control of the operation of the fuel supply amount control device 6, which controls the amount of the fuel supplied to the engine E and the operation of the starter motor 7, as well as the control during ignition. In order to carry out these functions, the following signals are input into the FIECU 11: a signal from the vehicle speed sensor $S_1$ that detects the vehicle speed based on the number or rotations of the rear wheels Wr and Wr, which are coupled driving wheels; a signal from the engine rotation number sensor $S_2$ that detects the number of rotations of the engine; a signal from the shift position sensor $S_3$ that detects the gear shift position of the transmission T; a signal from the break switch $S_4$ that detects the operation of the clutch pedal 9; a signal from the throttle opening degree sensor $S_6$ that detects the degree that the throttle is open; and a signal from the suction pipe vacuum sensor $S_6$ that detects the suction pipe vacuum.

Moreover, in FIG. 1 reference FIG. 21 denotes the CVTECU for controlling the CVT, reference numeral 31 denotes the battery ECU, which conserves the battery 3 and calculates the remaining capacity of the battery 3.

Figure 2:
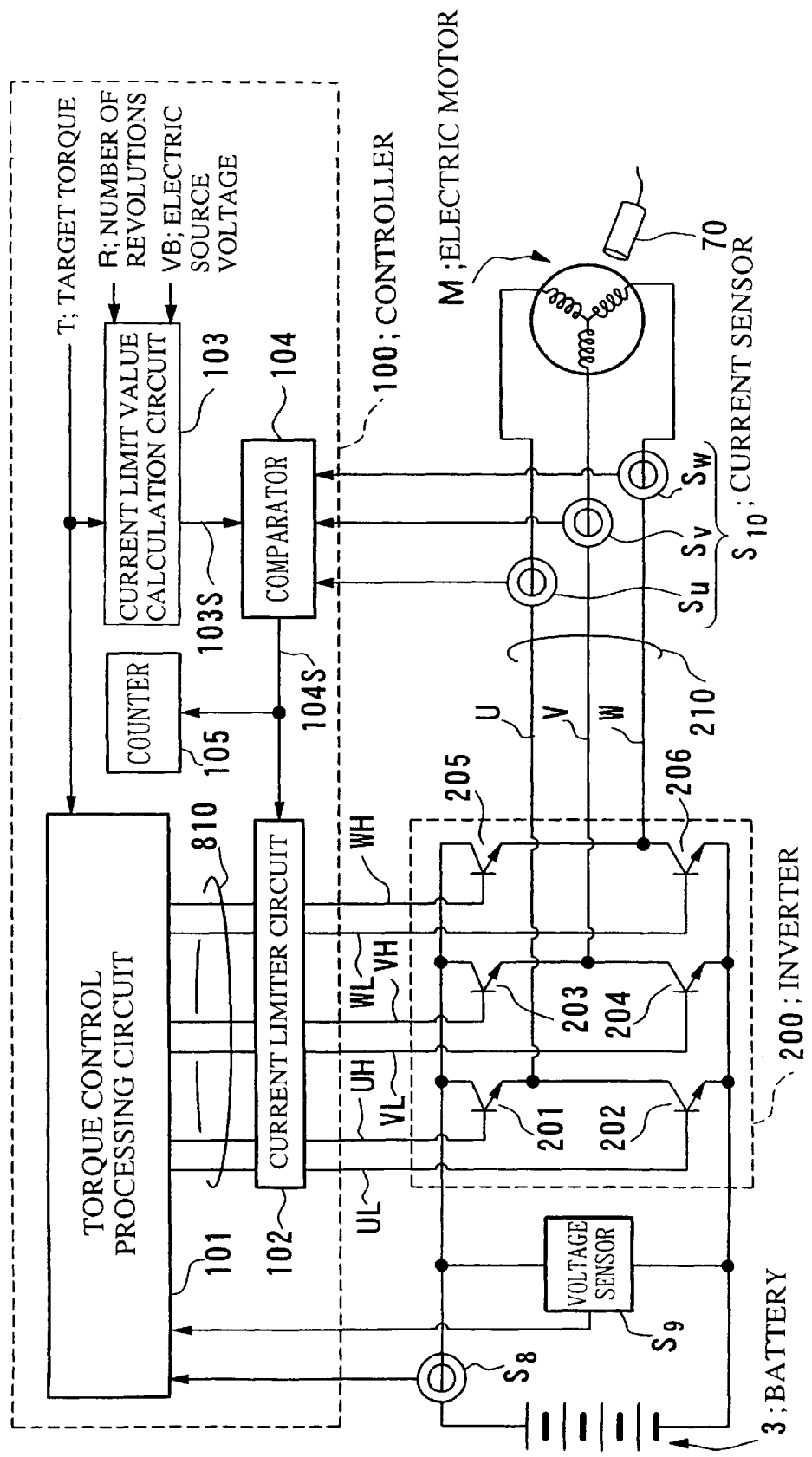
FIG. 2 is a drawing showing an example of the application of the failure detection system according to the embodiment of the present invention.

In FIG. 2, the elements related to the failure detection system according to this embodiment are extracted from the essential elements of the propulsion system that are shown in FIG. 1 and described above.

In FIG. 2, reference symbols Su, Sv, and Sw are current sensors for detecting each of the phase currents of the three-phase current supplied to the electric motor M from the inverter 200 via the three-phase lines 210, and these form the current sensor Reference numeral 200 is an inverter built into the power unit drive, 2 that converts direct current from battery 3 into three-phase alternating current, which is then supplied to the electric motor M. Reference numeral 100 is a controller built into the motor ECU 1, and along with the torque control processing circuit 101 that carries out processing related to the torque control of the electric motor M, comprises the voltage limiter circuit 102, the current limiter control calculation circuit 103, the comparator 104, and the counter 105, which are for carrying out the failure detection according to this invention.

Here, the torque control processing circuit 101 provides signals UL, UH, VL, VH, WL, and WH for drive controlling the inverter 200 depending on an externally indicated target torque T via the gate drive line 810. Thereby, it carries out torque control of electric motor M and has the same function as the controller 800 shown in FIG. 5 and described above.

The current limiter circuit 102 is provided on the gate drive line 810, and in the case that any of the phase currents supplied to the electric motor M rises abnormally, it can limit the current supplied to the electric motor M by limiting the voltage values of signals UL, UH, VL, VH, WL, and WH provided to the inverter 200. The current limit value calculation circuit 103 calculates the current limit value 103S that provides the reference for limiting the current supplied to the electronic motor M after detecting an abnormal rise in any of the phase currents supplied to the electric motor M.

Moreover, in this embodiment, "rise in current" device an increase in the absolute value of the current. Therefore, the concept of "rise in current" naturally includes the case that the current increases in the positive direction, but also includes an increase in the negative direction.

The comparator 104 compares the reference current value 103S and the phase current values detected by the current sensor $S_{10}$, and outputs a signal 104S indicating whether or not the phase current values have exceeded the reference current values 103S. The counter 105 counts the number of times the phase currents supplied to the electric motor M rise abnormally based on the signal 104A form the comparator 104

In addition, although not illustrated, the controller 100 provides a failure identification processor for carrying out processing to identify the failure based on the count value of the counter 105. In this failure identification processor, the failure detection conditions given as assumed conditions for identifying failure are set in advance, and identification is carried out based on the count value of the counter 105 when these failure detection conditions are satisfied. In this embodiment, two failure detection conditions are the number of revolutions of the electric motor M rising to or above 2000 rpm and the output torque rising to or above 1 kgfm.

In addition, in this failure identification processor, a threshold value that gives the reference for determining the occurrence of failure is set. This threshold value is the target indicating that the frequency of occurrence of abnormal rises of the current in any phase current supplied to the electric motor M has significantly exceeded the frequency of occurrence of abnormal rises of current that occur by chance due to factors other than failure, such as noise. In the propulsion system using the present invention, threshold values can be obtained experimentally, for example, by observing a number of occurrences of abnormal rises in current within a given regular interval.

Hereinafter, the operation of the failure detection system according to this embodiment will be explained first when there is no failure.

Figure 3A:
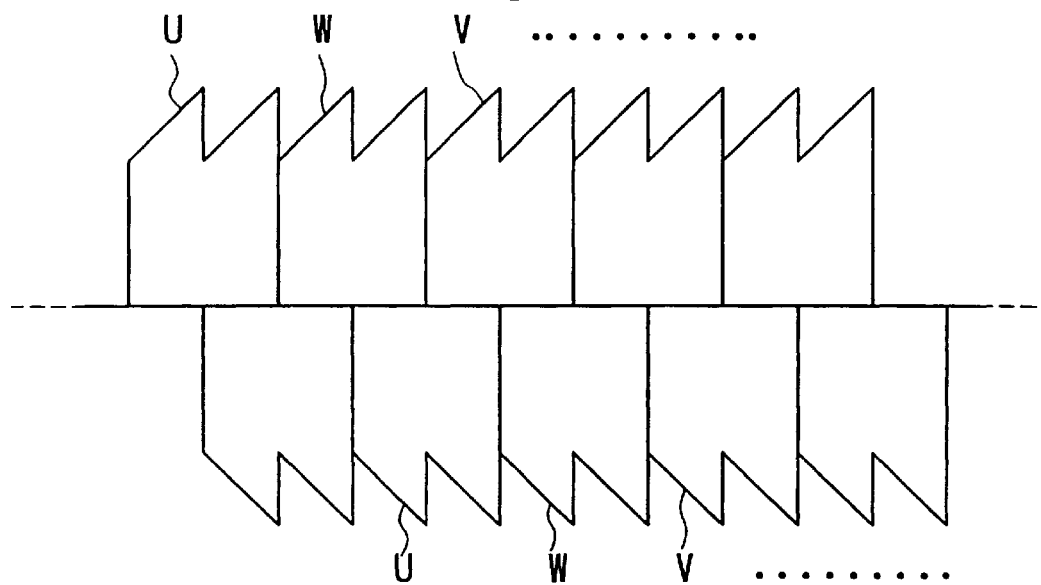
FIGS. 3A and 3B are drawings of waveforms of the phase currents for explaining the operation of the failure detection system according to the embodiment of the present invention.

The torque control processing circuit 101 of the controller 100 calculates the target current that should be supplied from the battery after obtaining this target torque T based on the target torque T indicated externally. In addition, as shown in FIG. 3A, the voltage of each of the signals UL, UH, VL, VH, WL, and WH are adjusted in the direction in which the product of the voltage value and current value respectively detected by the voltage sensor $S_9$ and the current sensor $S_8$ is identical to the target value and applied to the gates of the inverter 200, and thereby torque control of the electric motor M is carried out.

Meanwhile, the current limit value calculation circuit 103 calculates the current limiter value 103S that gives the reference for determining abnormal rises in the phase currents supplied to the electric motor M. The phase currents supplied to the electric motor M differ depending on the target torque T that should be generated, the number of revolutions R of the electric motor M, and the electrical source voltage VB of the battery 3. This device that when the target torque T is set high, each of the phase currents increases, and when the target torque T is set low, each of the phase currents decreases. Furthermore, because the output torque of the electric motor M is set depending on the power (the product of the current and voltage) supplied to the electric motor M, the phase currents also change depending on the electric source voltage of the battery 3.

In this manner, in the state of normal operation, the phase currents always change depending on the target torque T, the number of revolutions R, and the electric source voltage VB. Thereby, the determination of whether or not the rise in a phase current supplied to the electric motor M is abnormal must take into consideration, for example, the target torque T and the number of revolutions R. Thus, the current limit value calculation circuit 103 calculates the current limiter value 103S that gives the reference for the determination of whether or not the rise of a phase current is abnormal based on the target torque T, the number of revolutions R of the electric motor M, and the electric source voltage VB.

The comparator 104 compares the current limit value 103S calculated by the current limited value calculation circuit 103 and each of the phase current values detected by each current sensor Su, Sv, and Sw, and a signal 104S is output that shows whether or not the detected phase current values exceed the current limit value 103S. Here, because there is no failure, the value of each of the phase currents detected by the current sensor $S_{10}$ does not exceed the current limit value 103S, and a signal 104S to this effect is output. In the following explanation, when any phase current detected by the current sensor $S_{10}$, exceeds the current limit value 103S, the signal 104S shows the logical value '1', and in the case that a phase current does not exceed the current limit value 103S, the signal 104S shows the logical value '0'.

When the current limiter circuit 102 receives the signal 104S showing the logical value '0' to the effect that the phase current values have not exceeded the current limit value 103S, the signals UL, UH, VL, VH, WL, and WH output from the torque control processing circuit 101 are not limited, and provided to the inverter 200 as is.

The counter 105 inputs the signal 104S from the comparator 104, and counts the logical value '1' to the effect that the phase current values do not exceed that current limit value 103S.

Figure 4A:
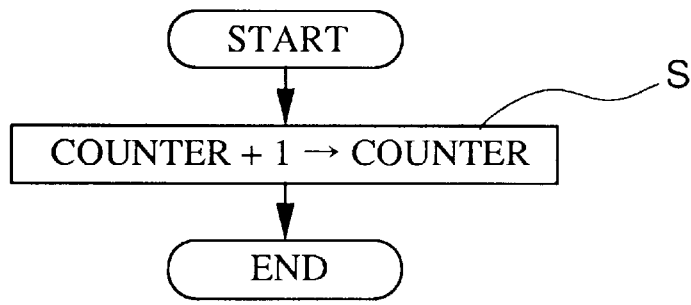
FIGS. 4A and 4B are flow charts for explaining the flow of the operation of the failure detection system according to the embodiment of the present invention.

This device that, as shown in FIG. 4A, when the logical value '1' of signal 104S is input, the counter 105 adds the '1' to the current counter values, and this becomes the new counter value. Thereby, the logical value '1' of the signal 104S is accumulated and becomes the counter value (step S). The flow shown in FIG. 4A is a routine executed when necessary in the case that the logical value '1' is output from the comparator as the signal 104S. Here, since there is no failure, the signal 104S is set to the logical value '0', and the count value of the counter 105 is maintained at zero The failure identification processor of the controller 100 (not illustrated), as explained below, executes processing for identifying the occurrence of failure based on the count number of the counter 105 at specified intervals following the flow shown in FIG. 4B.

Step S1: First, whether or not the number of rotations R and output torque of the electric motor satisfy the failure detection conditions is identified. Here, two conditions are set as failure detection conditions: the number of revolutions of the electric motor M being equal to or greater than 2000 rpm, and the output torque being equal to or greater than 1 kgfm. Thus, each of these conditions is identified as being satisfied or not.

Step 2: Here, in the case that the failure detection conditions are satisfied (step S1: YES), the counter value of the counter 105 is identified as being equal to or above the threshold value that gives the target for determining the occurrence of failure.

Step 3: In the case that the count value is equal to or greater than this threshold value (step S2: YES), failure is ascertained has having occurred, and identification to the effect that failure has occurred is made.

Step 4: In addition, in step S1 described above, in the case that the failure determination conditions are not satisfied (step S1: NO), and in addition, in the case that in step S2 the count value is less than the threshold value (step S2: NO), the count value of the counter 105 is reset to zero, and this processing finishes for the time being.

The sequence of processes from the above-described S1 to S4 is a routine that is executed at every specified interval of 100 msec, for example, and this processing is repeated at this specified time interval.

Figure 4B:
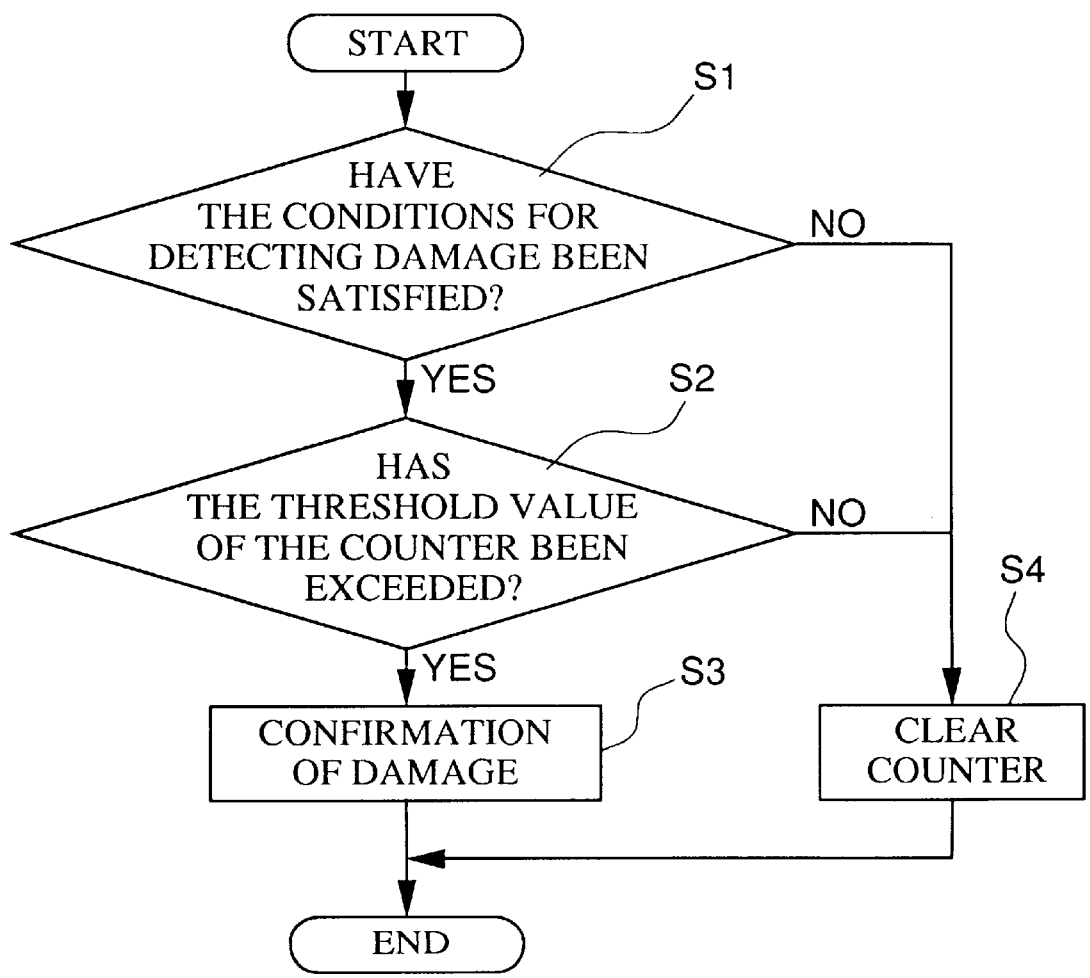

In the step in which the processing shown in FIG. 4B explained above is executed, because the counter 105 is reset at a specified time, in the end, the count value of the counter 105 shows the number of occurrences of abnormal rises in current for a specified interval. In this embodiment, the processing shown in FIG. 4B is executed every 100 msec, and the cycle for repeating this processing is set, for example, equal to the interval set when obtaining the above described threshold value (the interval for observing the number of occurrences of abnormal rises in current).

According to the above, the failure identification is carried out by failure identification processing, not illustrated, based on the count value of the counter 105.

Next, in FIGS. 2A and 2B, the operation of the failure detection system according to this embodiment is concretely explained using as an example the case in which the wire of the V phase, which forms part of the three-phase wiring, is broken.

Figure 3B:
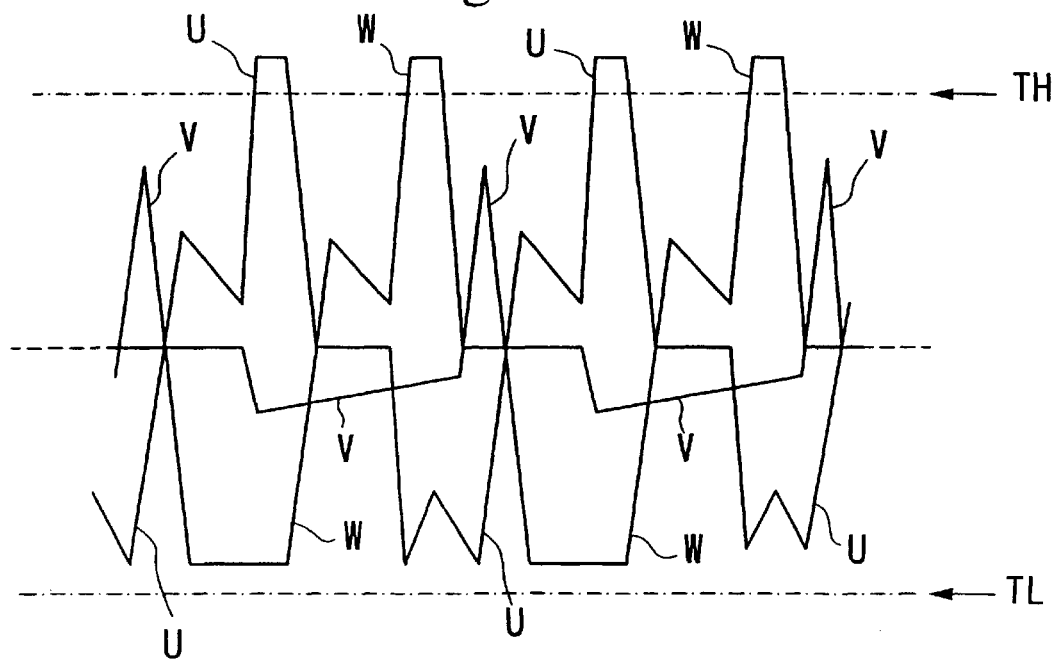

In this case, as shown in FIG. 3B, among the three-phase currents supplies to the electrical motor M, the V phase current is obstructed, and the output torque of the electric motor M decreases. At this time, the torque control processing circuit 101 raises each of the U and W phase currents so that this output torque maintains the target torque.

Here, as shown in FIG. 3B, when the U and W phase currents exceed the current threshold value TH (or the threshold value TL) specified by the current limit value 103S, the comparator 104 outputs the logical value '1' as the signal 140S. The current limiter circuit 102 that inputs this signal 140S lowers the voltage values of signals UL, UH, VL, VH, WL, and WH, and limits the current supplied to the electric motor M from the inverter 200 so as not to become excessive. Therefore, in this case the torque control of the electric motor M is carried out in a state in which the current supplied to the electric motor M from the current limiter circuit 102 is limited.

In addition, each time the U or W phase of the current value exceeds the threshold value TH, the comparator 104 outputs the logical value '1' as the signal 104S, and the count value of the counter 105 is incremented. When the count value of the counter 105 exceeds the threshold value that gives the reference for determining the occurrence of failure, the failure identification processor not, illustrated determines that failure that obstructs current supplied to the electric motor M has occurred, and detects that failure. The result of this detection is used in various types of warning processes such as notification of the occurrence of failure to the driver.

According to the failure detection system in the above-described embodiment, when a given phase current supplied to the electric motor M for propulsion is obstructed, the rising of the other phase currents is detected, and failure is identified by detecting this rise in a phase current. Thus, the occurrences of failure of the type that obstructs a phase current supplied to an electric motor M for propulsion can be detected. Therefore, even in the state in which the electric motor is torque controlled, the driver can know about the occurrence of failure early.

In addition, in the above-described embodiment, the operation for detecting failure was explained using as an example the case that one of the three-phase wires 210 was broken, but according to the failure detection system in this embodiment, not just the broken a wire of the three-phase wiring 210, but the occurrence of all failure that causes lowering of the output torque of the electric motor M can be detected. Examples are cases in which the gate drive line 810 wires are broken and the conductivity of any transistor (IGBT) forming the inverter 200 becomes defective, or cases in which the motor windings of the electric motor M are broken, or the permanent magnetic of the electric motor becomes attenuated.

The reason is that in this type of propulsion system, when the current supplied to the electric motor M is controlled so that the output torque of the electric motor will attain the target torque, and lowering of the output torque occurs, the current supplied to the electric motor rises. For example, in the case that the supply of a certain phase current becomes obstructed, torque control is carried out so that the current input into the inverter 200 agrees with a target value, and as a result, the current values of the remaining phases increases beyond the normal value. In addition, in the case that the permanent magnet of the electric motor M becomes attenuated as well, as a result of torque control carried out so that the power input into the inverter agrees with a target value, the necessary output torque is obtained. At this time, because the torque constant also changes, the flowing of phase currents having a higher value than normal is necessary, and the phase currents increase. Therefore, in the case that this kind of phenomenon occurs, the current limiter circuit 102 activates, and by confirming the number of operations for each unit of time, the presence or absence of failure can be determined.

In addition, in the embodiment described above, an example of failure in which one of the phase currents rises was explained, but in the case that the cause of the failure is inside the electric motor M, as a result of torque control being carried out, there are cases in which the current values of all phases show a tendency to rise. Therefore, in this case by detecting that all the phase currents have risen abnormally, the failed part can be specified. In the same manner, a structure is possible wherein the failed part is deduced by analyzing the parts whose currents have abnormally risen and displaying the part in which failure has occurred.

As shown above, an embodiment of this invention has been explained, but this invention is not limited to this embodiment. Design changes that do not depart from the gist of the present invention and are included in this invention are possible. For example, a current limiter circuit 102 is provided in the above-described embodiment, and in the case that a phase current rises abnormally, the current supplied to the electric motor M is limited, but in the case that the impact is not such that the rise in current supplied to the electric motor will particularly spread the failure, the current limiter circuit 102 can be omitted, and the current limiter circuit 102 can be installed as necessary.

In addition, in the above-described embodiment, a propulsion system was explained that is formed so that three-phase alternating current is supplied to the electric motor M, but this is not limiting, and a propulsion system formed so that any polyphase alternating current supplied to the electric motor is satisfactory.

Furthermore, in the above-described embodiment, the current limit value calculation circuit 103 calculates the current limit value 103S based on the target torque, the number of rotations R, and the electric source voltage VB, but this is not limiting, and depending on the character of the propulsion system in which this invention is applied, the current limited value can be suitably set.

Furthermore, in the above-described embodiment, the electric limiter circuit 102 was installed separately, but this can be realized as a function of the torque control processing circuit 101.

As explained above, according to the present invention the following effects can be attained.

In a propulsion system for electric automobiles, hybrid vehicles, etc., the occurrence of failure of a type in which the current supplied to the electric motor for propulsion can be detected because the propulsion system is formed so that each phase current of a polyphase current changes in the direction in which the output torque of an electric motor attains a target torque that the electric motor should generate, abnormal rises in current in any of the phases of the polyphase current are detected and failure is identified based on the frequency of the occurrence of the detected abnormal rise in current.

In addition, an abnormal rise in the phase currents supplied to an electric motor can be detected because each of the phase currents of a polyphase current, supplied to an electric motor M are detected, a reference value that provides a reference for detecting an abnormal rise in the current is calculated depending on the target torque, the number of rotations of the electric motor, and the electric source voltage supplied to the electric motor, and the detected value of each phase of the current is compared to the reference value.

A rise in phase currents due to failure can be identified because identification of the occurrence of failure is carried out by counting the number of occurrences of abnormal rises in current based on the result of a comparison of the value of each of the phase currents and a reference value, and using as a condition this count value significantly exceeding the frequency of occurrences of abnormal rises in current that would occur by chance in each of the phase currents supplied to the electric motor,. Therefore, while avoiding misidentifications related to the occurrence of failure, only the occurrence of failure can be detected.

Furthermore, the spreading of failure caused by a rise in the current because of failure can be prevented because each of the phase currents supplied to the electric motor is limited based on the result of a comparison between the values of each of the phase currents and a reference value.

What is claimed is:

1. A failure detection system in a propulsion system providing an electric motor as a propulsion device to running an automotive vehicle and a motor control system that drives said electric motor by supplying polyphase current to said electric motor, and wherein the propulsion system is formed such that each of the phase currents of the polyphase current changes so that the output torque of said electric motor attains the target torque that the electric motor should generate, comprising:

an abnormal current detection device that detects abnormal current in any phase of said polyphase current; and a failure identification device that identifies failure based on the frequency of occurrences of abnormal increases in current detected by said abnormal current detection device.

2. A failure detection system in the propulsion system according to claim 1, wherein said abnormal current detection device comprises:

a current sensor that detects each of the respective phase currents of a polyphase current applied to said electric motor from said motor control system;

a reference value calculation circuit that calculates a reference value that provides a standard for detecting said abnormal current depending on said target torque, the number of rotations of said electric motor, and the electric source voltage supplied to said electric motor; and a comparator that compares values of each of the phase currents detected by said current sensor and said reference value.

3. A failure detection system in a propulsion system according to claim 1, wherein said failure identification device comprises:

a counter that counts the number of occurrences of said abnormal increases in current based on the results of the comparison by said comparator, wherein the occurrence of failure is identified under the condition that the count value of said counter significantly exceeds the frequency of the occurrence of abnormal increases of current that would occur by random change in each of the phase currents supplied to said electric motor.

4. A failure detection system in a propulsion system according to claim 2, wherein said failure identification device comprises:

a counter that counts the number of occurrences of said abnormal increases in current based on the results of the comparison by said comparator, and wherein the occurrence of failure is identified under the condition that the count value of said counter significantly exceeds the frequency of the occurrence of abnormal increases of current that would occur by random change in each of the phase currents supplied to said electric motor.

5. A failure detection system in a propulsion system according to claim 1 comprising:

a current limiter circuit that limits each of the phase currents supplied to said electric motor based on the result of the comparison of said comparator.

6. A failure detection system in a propulsion system according to claim 2 comprising:

a current limiter circuit that limits each of the phase currents applied to said electric motor based on the results of the comparison of said comparator.

7. A failure detection system in a propulsion system according to claim 3 comprising:

a current limiter circuit that limits each of the phase currents supplied to said electric motor based on the result of the comparison of said comparator.

* * * * *